United States Patent
Petot et al.

(10) Patent No.: US 11,554,691 B2
(45) Date of Patent: Jan. 17, 2023

(54) DEVICE FOR COVERING A VEHICLE SEAT RAIL AND VEHICLE COMPRISING SUCH A DEVICE

(71) Applicant: FAURECIA Sièges d'Automobile, Nanterre (FR)

(72) Inventors: Guillaume Petot, La Ferrière aux Etangs (FR); Fabrice Petit, Saint Georges des Groseillers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 408 days.

(21) Appl. No.: 16/732,390

(22) Filed: Jan. 2, 2020

(65) Prior Publication Data

US 2020/0215937 A1    Jul. 9, 2020

(30) Foreign Application Priority Data

Jan. 3, 2019  (FR) ..................... 19 00038

(51) Int. Cl.
| | | |
|---|---|---|
| *B60N 2/07* | (2006.01) | |
| *B60R 16/02* | (2006.01) | |
| *B60R 16/037* | (2006.01) | |

(52) U.S. Cl.
CPC ........ *B60N 2/0725* (2013.01); *B60R 16/0215* (2013.01); *B60R 16/037* (2013.01)

(58) Field of Classification Search
CPC .. B60N 2/0725; B60R 16/0215; B60R 16/037
USPC ................................................. 296/193.07
See application file for complete search history.

(56) References Cited

U.S. PATENT DOCUMENTS

| | | | | |
|---|---|---|---|---|
| 6,145,911 A | * | 11/2000 | Sturt ..................... | B60N 3/042 |
| | | | | 296/65.01 |
| 2002/0057007 A1 | * | 5/2002 | Furukawa ............ | B60N 2/0705 |
| | | | | 297/344.11 |
| 2004/0155168 A1 | | 8/2004 | Matsushiro | |
| 2007/0170743 A1 | | 7/2007 | Kinoshita | |
| 2014/0091610 A1 | | 4/2014 | Clark | |
| 2020/0156509 A1 | | 5/2020 | Yamamoto | |

FOREIGN PATENT DOCUMENTS

| | | |
|---|---|---|
| DE | 4233517 C1 | 11/1993 |
| DE | 4334311 A | 4/1995 |
| DE | 19947148 A | 4/2001 |
| DE | 102005043556 A1 | 3/2007 |
| DE | 102017209452 A | 12/2018 |
| DE | 112018003203 T | 3/2020 |
| EP | 0786370 A1 | 7/1997 |
| FR | 2902711 A1 | 12/2007 |
| JP | 2008080870 A | 4/2008 |
| JP | 2012250601 A | 12/2012 |
| JP | 2014019293 A | 2/2014 |

(Continued)

OTHER PUBLICATIONS

French Preliminary Search Report for French App. No. FR1900038, dated Oct. 28, 2019, 14 pages, English translation provided.

*Primary Examiner* — Mark R Wendell
(74) *Attorney, Agent, or Firm* — Barnes & Thornburg LLP

(57) ABSTRACT

The device for covering a rail of a vehicle seat comprises a cover strip for the rail and a guide support for guiding the sliding of the cover strip above the rail, the at least one guide support supporting the cover strip on side of said strip.

19 Claims, 5 Drawing Sheets

(56) References Cited

FOREIGN PATENT DOCUMENTS

Figure 1:
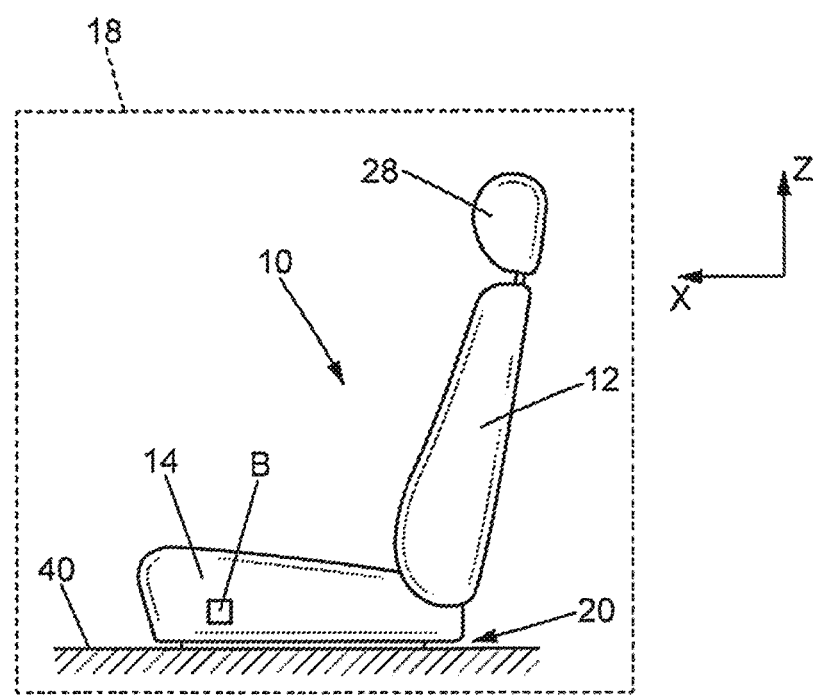

| | | |
|---|---|---|
| JP | 2014019298 A | 2/2014 |
| JP | 2014177277 A | 9/2014 |
| JP | 2016013042 A | 1/2016 |
| JP | 2017206951 A | 11/2017 |
| WO | 2012138869 A2 | 10/2012 |

* cited by examiner

DEVICE FOR COVERING A VEHICLE SEAT RAIL AND VEHICLE COMPRISING SUCH A DEVICE

PRIORITY CLAIM

This application claims priority to French Patent Application No. FR 00038, filed Jan. 3, 2019, which is expressly incorporated by reference herein.

BACKGROUND

The present disclosure relates to a device for covering a vehicle seat rail, in particular of a motor vehicle, and to a vehicle, in particular a motor vehicle, comprising such a device.

SUMMARY

According to the present disclosure, a device for covering a vehicle seat rail, in particular of a motor vehicle, comprising a cover strip for the rail intended to be integral to the seat, and a guide support for guiding the sliding of the cover strip above the rail, the at least one guide support supporting the cover strip on each side of said strip.

In illustrative embodiments, the support of the cover strip on its two lateral sides gives the device good mechanical strength. The fact that the cover strip is integral with the vehicle seat makes it possible to control the movement of this cover strip simply by controlling the rail or rails that control the longitudinal displacement of the seat.

In illustrative embodiments, the device may include one or more of the following features, alone or in combination:
the cover strip is provided with mechanical reinforcing members;
the reinforcing members comprise longitudinal rods fixed to one side and/or the other of the cover strip;
at least one of the rods is hollow, preferably suitable for receiving at least one electrical wiring for the seat;
the cover strip forms, on at least one side, preferably on each side, a receiving housing for a rod;
the at least one guide support defines two housings, each housing enveloping a respective side of the cover strip;
the two housings envelop the sides of the cover strip so as to guide the longitudinal sliding of the cover strip;
at least one housing has a curved cross-section, a reinforcing member preferably being received at the bottom of the housing, the cover strip and/or said reinforcing member, where appropriate, having a curved portion to follow the shape of the housing, the at least one guide support preferably further forming two such housings;
the reinforcing members comprise rods extending in a direction substantially transverse to the cover strip;
the at least one guide support forms two substantially planar housings suitable for receiving the lateral sides of the cover strip and, preferably, rods; and
the cover strip is intended to be integral to the vehicle seat, on two opposite sides of the vehicle seat, the covering device preferably comprising at least one deflection system to guide the cover strip, for example under the vehicle seat.

In illustrative embodiments, a vehicle is described, in particular a motor vehicle, comprising a body, a vehicle seat, at least one rail connecting the vehicle seat to the body, and a floor arranged on the body or formed by the body, the floor defining at least one slot at the at least one rail, the vehicle further comprising at least one covering device for the at least one rail, as described above in any of its combinations, the at least one covering device being integral with the floor.

In illustrative embodiments, the at least one guide support for the at least one covering device may be formed by the floor.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
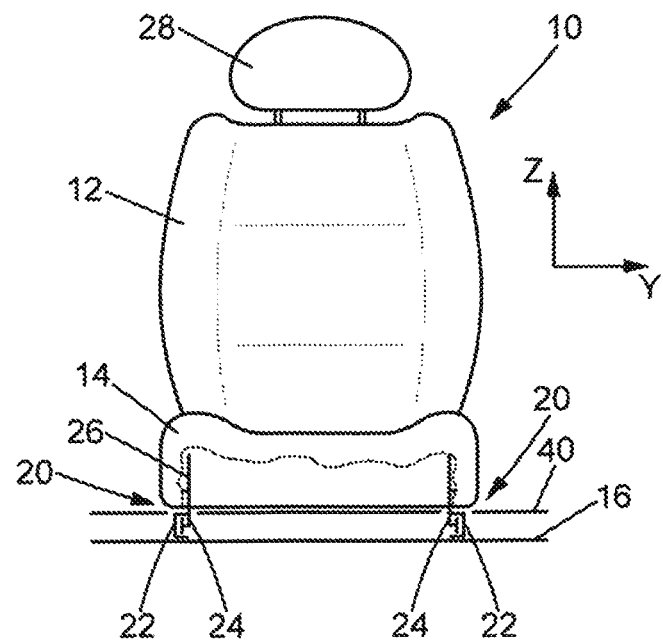
Figure 3:
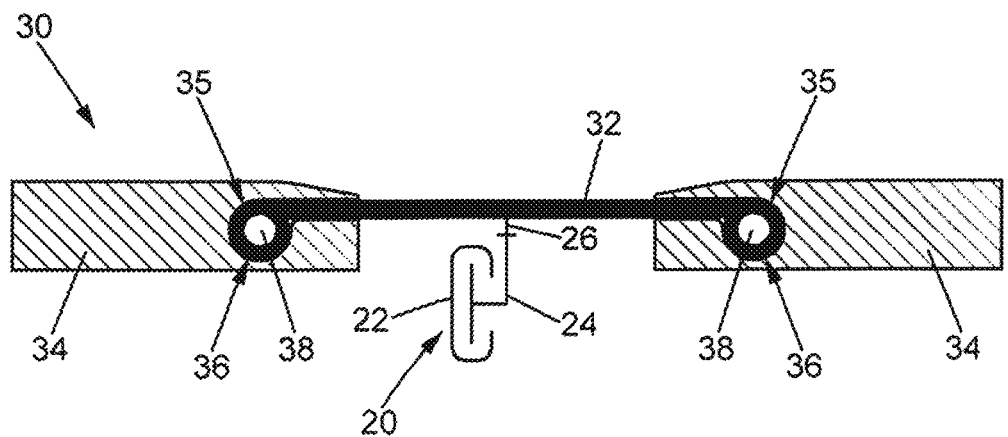
Figure 4:
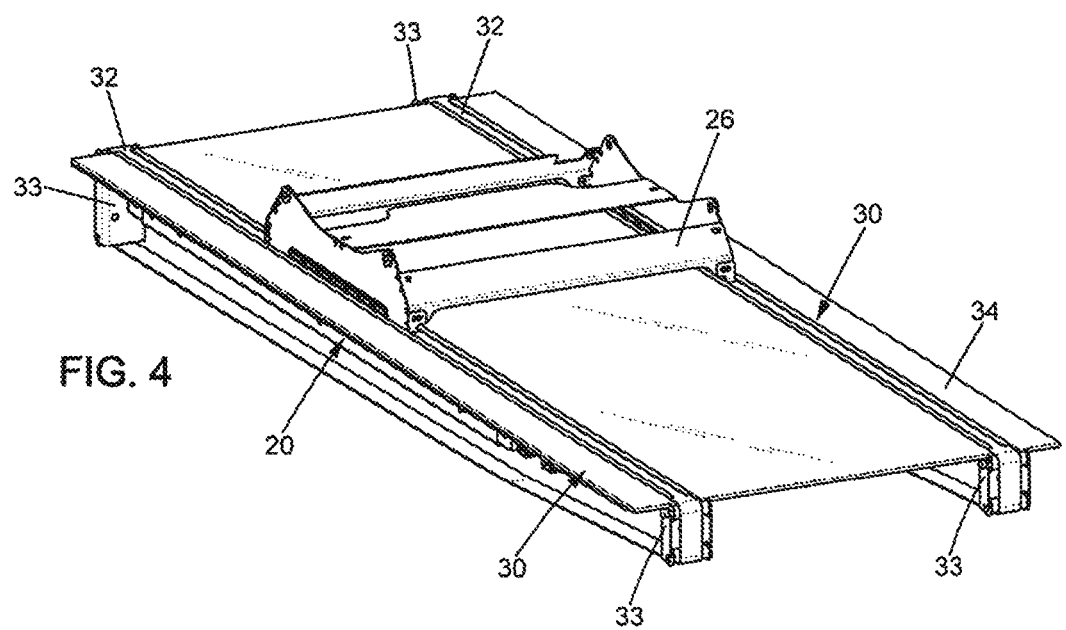
Figure 5:
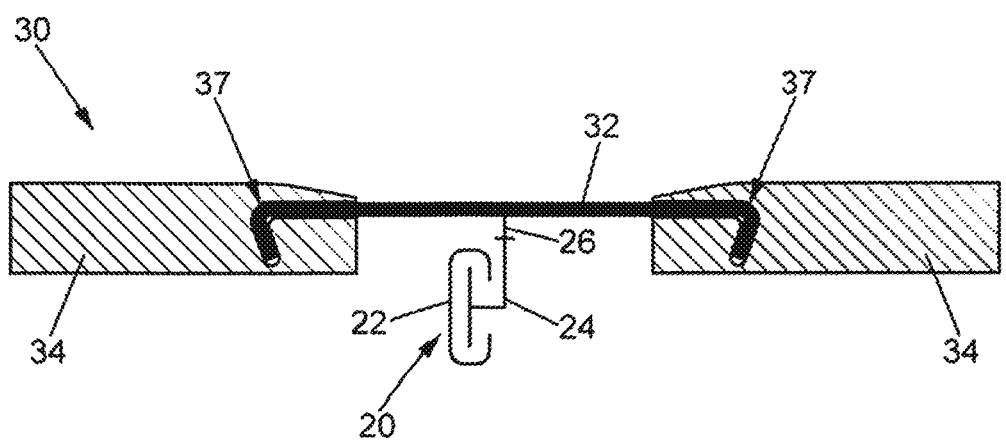
Figure 6:
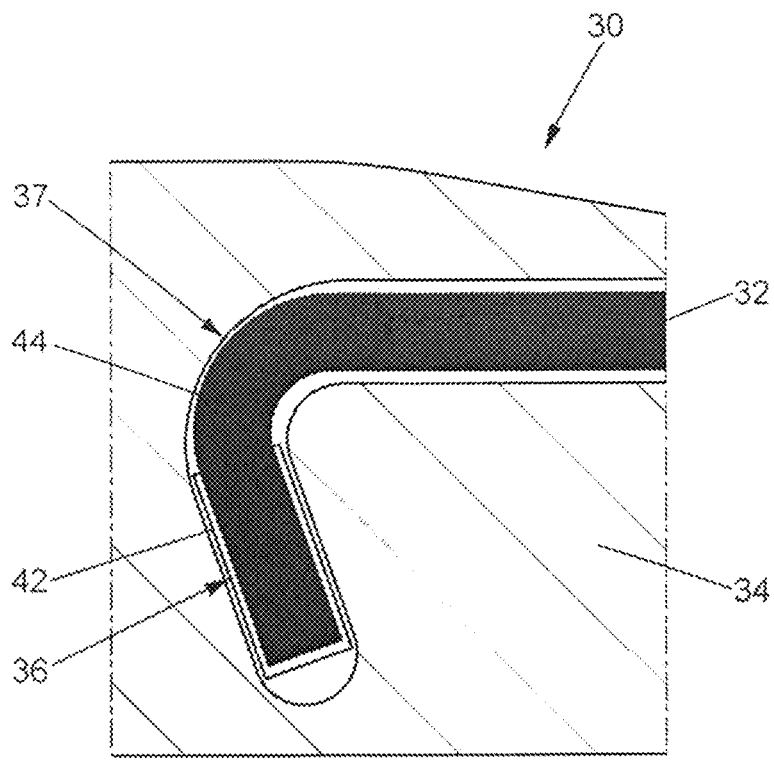
Figure 7:
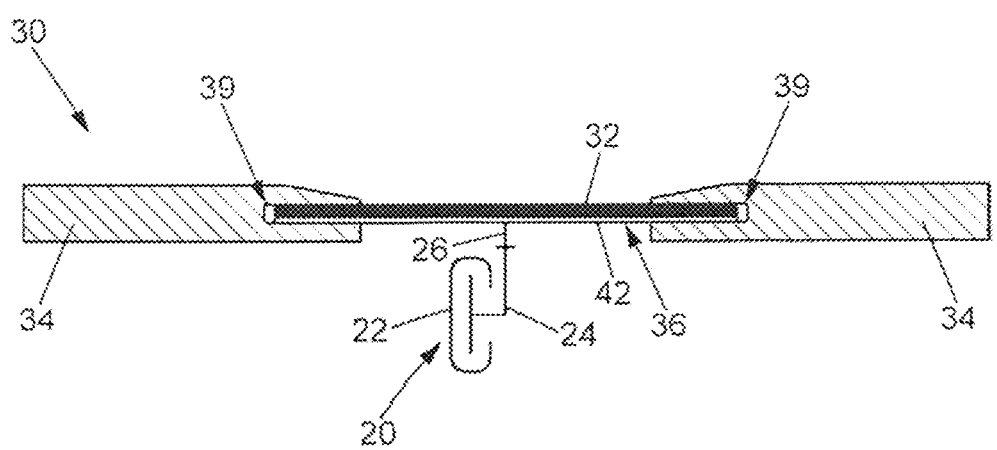
Figure 8:
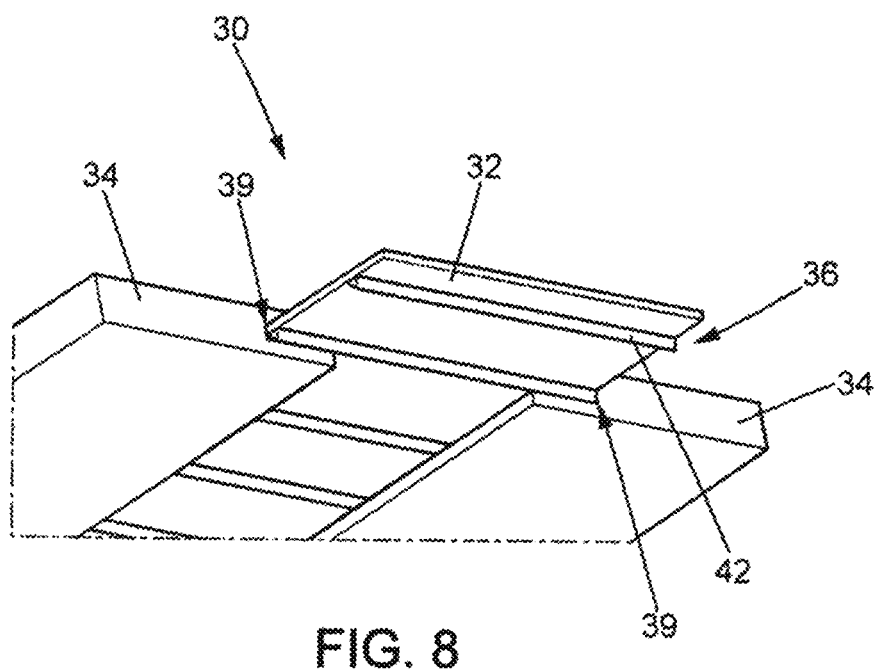

The detailed description particularly refers to the accompanying figures in which:

FIG. 1 schematically represents a side view of an exemplary vehicle seat mounted in a vehicle;

FIG. 2 schematically represents a front view of the exemplary vehicle seat of FIG. 1;

FIG. 3 schematically represents a cross-section of a first exemplary rail-covering device that can be implemented in cooperation with the seat of FIGS. 1 and 2;

FIG. 4 schematically represents a perspective view of an exemplary implementation of two covering devices according to FIG. 3;

FIG. 5 schematically represents a cross-section of a second exemplary rail-covering device that can be implemented in cooperation with the seat of FIGS. 1 and 2;

FIG. 6 illustrates details of the exemplary rail-covering device of FIG. 5;

FIG. 7 schematically represents a cross-section of a third exemplary rail-covering device that can be implemented in cooperation with the seat of FIGS. 1 and 2; and FIG. 8 schematically represents a partial cutaway perspective view of the third exemplary rail-covering device illustrated in FIG. 7.

DETAILED DESCRIPTION

In the following description, elements that are identical or of identical function bear the same references. These elements are not described in detail for each figure. On the contrary, for brevity in the present description, only the differences between the various examples are described in detail.

FIGS. 1 and 2 show a vehicle seat 10, in this case of a motor vehicle, which comprises a backrest 12 carried by a seating portion 14, which itself is slidably mounted on the bottom of the body 16 (or chassis) of the vehicle 18, in a substantially horizontal longitudinal direction X.

The seating portion 14 is connected to the bottom of the body 16 by two parallel rails 20 extending in the longitudinal direction X.

Each of the rails 20 comprises a motorized electrical drive mechanism. The motorized drive mechanisms of the two rails 20 are synchronously controlled by a central electronic unit (for example a microcontroller or the like) according to the commands received in particular from a bidirectional control button B or the like which can be actuated by a user occupying the seat 10.

Each rail 20 comprises a first rail member 22 as well as a second rail member 24 mounted on the first rail member 22 so as to slide in the longitudinal direction X. One of these first and second rail members 22, 24 is connected to the bottom of the body 16 of the vehicle 18, the other to the seating portion 14, here via a connecting support 26. In the example shown, the first rail member 22 is integral with the floor of the body 16 and the second rail member 24 is integral with the seating portion 14, but the reverse would be possible.

The first rail member 22 may generally be a section, for example a metal section, and the second rail member 24 may also comprise a movable section, in particular a metal section, or another rigid element, slidably mounted on the first rail member 22.

The first rail member 22 of each rail 20 may, for example, have a C-shape opening horizontally towards the other rail 20 of the seat 10.

In the illustrated example, the first rail member 22 is a female member receiving the second rail member 24 which is male.

Furthermore, in the illustrated example the seat 10 also comprises a headrest 28, fixed to the backrest 12.

It is noteworthy that the vehicle 18 here is provided with devices 30 for covering the rails 20.

A first example of a covering device 30 is illustrated in FIG. 3. According to this first example, the covering device 30 comprises a strip 32 covering the rail 20 and at least one guide support 34, here two guide supports 34, for guiding the sliding of the cover strip 32 above the rail 20. Here, the guide supports 34 support the cover strip 32 on each side of said strip. To do this, each guide support 34 forms a substantially cylindrical housing 35 of a shape suitable for receiving a lateral end (or side) of the cover strip 32. The guide supports 34 thus make it possible to guarantee an acceptable rigidity of the cover strip 32 extending above the rail. In addition, each housing 35 forms a groove receiving or enveloping a lateral side of the cover strip 32. "Enveloping" is understood here to mean that the housing 35 minimizes vertical upward or downward movement of the side of the cover strip 32 that it receives and also a transverse movement of this side of the cover strip, in a direction opposite to the other side of the cover strip 32. The housings 35 therefore allow limiting or even preventing transverse movements of the cover strip 32, particularly of its lateral sides relative to one another. In doing so, the housings 35 forming a longitudinally extending groove guide the longitudinal sliding of the cover strip 32.

The cover strip 32 is generally flexible, preferably allowing a rolling of this cover strip 32 about a transverse axis. For example, the cover strip 32 is of woven material.

Here, the cover strip 32 comprises reinforcing members 36. The reinforcing members 36 here are in the form of longitudinal rods 38 integral to the cover strip 32. For example, here the cover strip 32 forms two substantially cylindrical lateral housings, each receiving a reinforcing rod 38. Advantageously, at least one of the reinforcing rods 38 may be hollow, in order to allow the passage of electrical wiring intended to connect the seat 10 to the rest of the vehicle 18. Alternatively, the rods 38 may be fixed to the cover strip 32 by any means accessible to those skilled in the art, for example by gluing. The reinforcing rods 38 are for example of metal or plastic.

The cover strip is advantageously integral to the seat 10, for example fixed to the connecting support 26 at one of its longitudinal ends. Thus, the movement of the seat 10 by means of the rails 20 causes movement of the cover strip 32 which thus always covers the rails 20. The other end of the cover strip 32 may be connected to a reel, particularly in the case where two cover strips 32 or even two covering devices 30 are implemented per rail 20, one in front of the seat 10 and the other behind the seat 10. Alternatively, however, as illustrated in FIG. 4, the other end of the cover strip 32 may also be secured to the seat 10, for example by being attached to the connecting support 26 on a face opposite the first end of the cover strip. One or more deflection systems 33, comprising for example pulleys or rollers, may then be used to guide the cover strip 32. In this case, a portion of the cover strip 32 preferably extends under the rail 20.

The guide supports 34 may be separate parts, attached to the body 16 or to a floor 40 covering the bottom of the body 16 of the motor vehicle 18. Alternatively, however, the guide supports 34 may be formed as a single piece, which may either be attached to the body 16 or the floor 40, or be the body 16 or the floor 40. The floor 40 may also be formed by the body 16.

FIGS. 5 and 6 illustrate a second example of a covering device 30. This second example is distinguished from the first example essentially by the shape of the reinforcing members 36 attached to the cover strip 32. Here, in fact, these reinforcing members 36 are in the form of slats 42 extending longitudinally in recesses 37 provided for this purpose in the guide supports 34. Each reinforcing slat 42 may in particular be made of metal or plastic.

In addition, the guide supports 34 each form a housing 37 having a curved cross-section, here in the form of a comma, which receives a reinforcing slat 42 at the bottom. The cover strip 32 and/or said reinforcing member 36 has/have a curved portion 44 to follow the shape of the housing 37. The curvature of the reinforcing member 36 and/or of the cover strip 32 contributes to further stiffening the cover strip 32 extending above the rail 20 by limiting or even preventing the relative transverse movements of the lateral sides of the cover strip 32. In addition, the slats 42 can act as weights which induce a stress on the cover strip 32.

FIGS. 7 and 8 illustrate a third example of a covering device 30. This third example differs from the first two essentially in that the reinforcing members 36 here are in the form of transverse rods 42 (or blades) fixed on the underside of the cover strip 32, facing towards the rail 20 to be concealed. In this example, the rods 42 extend substantially over the entire width of the cover strip 32. Under these conditions, the housing 39 formed by each of the translational guide supports 34 is substantially planar, adapted to receive the lateral sides of the cover strip 32 and rods 42. In other words, this housing 39 may be of substantially rectangular cross-section, open on the lateral side. Indeed, in this case, transverse movements of the lateral sides of the cover strip 32 are limited or even prevented by the fact that the rods 42 are attached to the cover strip 32 and thus fix the transverse dimensions of the cover strip, in particular its width, which is substantially equal to the distance between the side walls of each of the housings 39 formed by the translational guide supports 34. The cover strip 32 thus also retains a substantially planar shape.

In one example, the rods 42 are precisely transverse, to facilitate the rolling of the cover strip 32 about an axis extending in a direction transverse to the cover strip 32. However, alternatively, the rods 42 may be substantially transverse, meaning the rods 42 extend from one side of the cover strip 36 to the other, forming an angle different from 90° with the longitudinal direction of the cover strip 36.

For example, the reinforcing members 36 may take the form of longitudinal rolling of the cover strip 32, on each of its sides.

A vehicle seat may be fixed to the vehicle body by means of rails that allow adjusting the longitudinal position of the seat. This arrangement aims to improve the comfort of the seat occupant, who can adapt the position of the seat to his size, particularly the size of his legs. In some instances, longitudinal adjustment of the seat position may be limited.

The rails used are relatively short, generally shorter than the length of the vehicle seat. In these conditions, the rails are concealed under the vehicle seat itself.

However, in autonomous vehicles in particular, the range of adjustments of the longitudinal position of a seat may be increased. In some cases, rails longer than the vehicle seat may be used. In this particular case, the rails may be visible to the vehicle occupants, at least when the seat is in certain positions and may be unattractive. Such a configuration also may allow for foreign bodies to fall into the rail. These foreign bodies can affect the proper operation of the rail. Stiletto heels of shoes, for example, may also catch in the rail, from which they cannot be removed without damaging them.

In some examples, systems may comprise two lips extending from each side of a rail and covering it so that, as the seat travels, these lips move apart to allow the seat to slide. However, such systems have a relatively low mechanical strength, so that the chance of a foreign body being present in the slide, particularly a stiletto heel, cannot entirely be avoided.

The invention claimed is:

1. A covering device for covering a rail of a vehicle seat, the covering device comprising
   a cover strip for the rail intended to be integral to the seat and
   a guide support for guiding the sliding of the cover strip above the rail, the at least one guide support supporting the cover strip on each side of said strip,
   wherein the cover strip is provided with mechanical reinforcing members,
   wherein the reinforcing members comprise longitudinal rods fixed to at least one side of the cover strip, and
   wherein at least one of the rods is hollow.

2. The covering device of claim 1, wherein the at least one of the rods being hollow is suitable for receiving at least one electrical wiring for the seat.

3. The covering device of claim 1, wherein the cover strip forms, on at least one side, a receiving housing for a rod.

4. The covering device of claim 1, wherein the at least one guide support defines two housings, each housing enveloping a respective side of the cover strip.

5. The covering device according to claim 4, wherein the two housings envelop the sides of the cover strip so as to guide the longitudinal sliding of the cover strip.

6. The covering device of claim 4, wherein at least one housing has a curved cross-section, a reinforcing member being received at the bottom of the housing, the cover strip or said reinforcing member having a curved portion to follow the shape of the housing.

7. The covering device of claim 1, wherein the cover strip is intended to be integral to the vehicle seat, on two opposite sides of the vehicle seat.

8. A covering device for covering a rail of a vehicle seat, the covering device comprising
   a cover strip for the rail intended to be integral to the seat and
   a guide support for guiding the sliding of the cover strip above the rail, the at least one guide support supporting the cover strip on each side of said strip,
   wherein the at least one guide support defines two housings, each housing enveloping a respective side of the cover strip, and
   wherein at least one housing has a curved cross-section, the cover strip having a curved portion to follow the shape of the housing.

9. The covering device of claim 8, wherein the cover strip is provided with mechanical reinforcing members.

10. The covering device of claim 9, wherein the reinforcing members comprise longitudinal rods fixed to at least one side of the cover strip.

11. The covering device of claim 10, wherein at least one of the rods is hollow.

12. The covering device of claim 9, wherein the reinforcing members comprise rods extending in a direction substantially transverse to the cover strip.

13. The covering device of claim 12, wherein the at least one guide support forms two substantially planar housings suitable for receiving the lateral sides of the cover strip.

14. The covering device of claim 12, wherein the at least one guide support forms two substantially planar housings suitable for receiving the lateral sides of the cover strip and rods.

15. A covering device for covering a rail of a vehicle seat, the covering device comprising
   a cover strip for the rail intended to be integral to the seat and
   a guide support for guiding the sliding of the cover strip above the rail, the at least one guide support supporting the cover strip on each side of said strip,
   wherein the cover strip is intended to be integral to the vehicle seat, on two opposite sides of the vehicle seat, and,
   wherein the covering device comprises at least one deflection system to guide the cover strip.

16. The covering device of claim 15, wherein the cover strip forms, on at least one side, a receiving housing for a rod.

17. The covering device of claim 15, wherein the at least one deflection system guides the cover strip under the vehicle seat.

18. A vehicle comprising a body, a vehicle seat, at least one rail connecting the vehicle seat to the body, and a floor arranged on the body or formed by the body, the floor defining at least one slot at the at least one rail, the vehicle further comprising at least one covering device for the at least one rail, according to claim 1, the at least one covering device being integral with the floor.

19. The vehicle according to claim 18, wherein the at least one guide support for the at least one covering device is formed by the floor.

* * * * *